(No Model.)
H. B. STEELE.
LATHE AND PLANER TOOL.
No. 312,034. Patented Feb. 10, 1885.
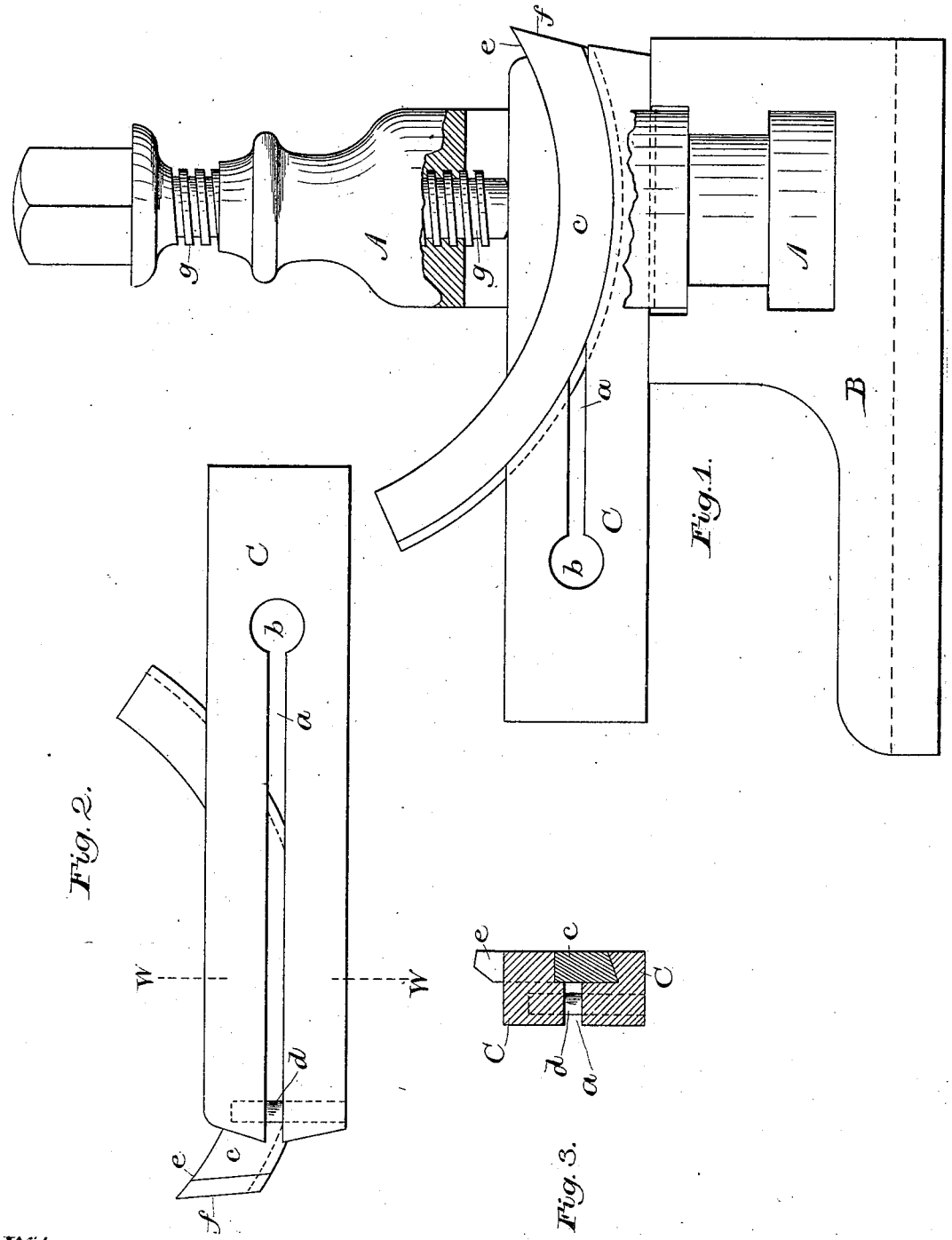
Witnesses
A. O. Orne
D. W. G. Humphrey
Inventor
Herbert B. Steele
per Porter & Hutchinson
Attys

UNITED STATES PATENT OFFICE.

HERBERT B. STEELE, OF SOMERVILLE, MASSACHUSETTS.

LATHE AND PLANER TOOL.

SPECIFICATION forming part of Letters Patent No. 312,034, dated February 10, 1885.

Application filed August 12, 1884. (No model.)

*To all whom it may concern:*

Be it known that I, HERBERT B. STEELE, of Somerville, in the county of Middlesex and State of Massachusetts, have invented a new and useful Improvement in Lathe and Planer Tools, which will, in connection with the accompanying drawings, be hereinafter fully described, and specifically defined in the appended claims.

This invention has for its object the production of an improved cutting-tool for use in lathes, planers, and other metal-working machines; and it will, in connection with the accompanying drawings, be hereinafter more particularly and fully described and claimed.

In said drawings, Figure 1 is a side elevation of my improved tool, shown as seated in the tool-post of a lathe for use. Fig. 2 is a detached view of the tool, shown on the reverse side from that in Fig. 1. Fig. 3 is a transverse section taken as on line W W, Fig. 2, and as viewed from the right in that figure.

In said views A represents the tool-post in part broken away to show the tool, and as inserted in the lathe-saddle B.

The stock of my improved tool is shown at C, and as longitudinally divided in part of its length by the horizontal slot $a$, which terminates in the circular opening $b$.

In the side of stock C, I form as an arc of a true circle a groove adapted to receive the cutting-bar $c$, which is formed, as shown, with a lower oblique or dovetail edge, that serves to secure it in place in the stock or holder C.

At the front end of stock C, I insert a pin, $d$, secured firmly in the lower half of the stock and fitting loosely in the upper half to allow the movement thereof, when acted on by the set-screw $g$, in the tool-post, said pin preventing lateral displacement of the two parts of the stock.

The curved dovetail groove in stock C may be readily formed by means of a milling-machine, and the cutting-bars $c$ may be formed as entire circles by welding the ends of steel bars thus bent and then shaping the same in a lathe; or they may be formed by milling, or as a drop-forging. By forming said bar $c$ as the arc of a true circle it may be advanced as it is worn away by grinding to sharpen it until its diminished length renders it unserviceable, and as it may be tempered throughout its entire length when first formed, it will not become of inferior quality by reason of repeated heating and hardening.

It will be obvious that this tool may, and necessarily will, be made both "right" and "left," and that instead of forming slot $a$ open at one end it may only be formed at and adjacent to the point where screw $g$ bears upon the stock; and if bar $c$ is fitted with great accuracy in the stock then it may be duly secured by the pressure of said screw, even though said slot be entirely omitted.

By forming bar $c$ curved, as shown, the requisite "rake" or acuteness of angle between the upper line, $e$, and end $f$ always exists to give the desired cutting-edge.

For convenience of grinding, the cutting-bar $c$ may be advanced in the stock, as shown in Fig. 2.

I claim as my invention—

1. The combination, in a lathe or planer tool, of a cutting-bar curved in its length bow-like, as an arc of a circle, and a stock formed with a coincidently-curved side groove to receive and support said cutting-bar, substantially as specified.

2. The combination of curved cutting-bar $c$ and body or stock C, grooved to receive and support said bar, and having slot $a$ and steadying-pin $d$, substantially as specified.

HERBERT B. STEELE.

Witnesses:
T. W. PORTER,
WILLIAM J. ROBINSON.